United States Patent [19]
Smith

[11] Patent Number: 5,991,359
[45] Date of Patent: Nov. 23, 1999

[54] CAMERA SYSTEM

[75] Inventor: Graham W. Smith, Hampshire, United Kingdom

[73] Assignee: The Secretary of State for Defence, London, United Kingdom

[21] Appl. No.: 08/983,241

[22] PCT Filed: Jun. 27, 1996

[86] PCT No.: PCT/GB96/01543

§ 371 Date: Feb. 18, 1998

§ 102(e) Date: Feb. 18, 1998

[87] PCT Pub. No.: WO97/02498

PCT Pub. Date: Jan. 23, 1997

[30] Foreign Application Priority Data

Jul. 1, 1995 [GB] United Kingdom .................... 9513444

[51] Int. Cl.⁶ .................................................. H05G 1/64
[52] U.S. Cl. ................. 378/98.2; 378/98.7; 250/214 VT
[58] Field of Search ................................. 378/98.2, 98.7; 250/370.08, 214 VT

[56] References Cited

U.S. PATENT DOCUMENTS 4,679,212  7/1987  Hynecek ..................................... 377/58
5,569,907  10/1996  Meunier ................................ 250/208.1

Primary Examiner—David P. Porta
Assistant Examiner—Michael J. Schwartz
Attorney, Agent, or Firm—Nixon & Vanderhye P.C.

[57] ABSTRACT

A camera system for recording a transient radiation event consisting of direct (2) and scattered (4) radiation. The camera system comprises a first fluorescent screen (10) which produces a light image (11) of the direct radiation (2) and a television camera (18) which is positioned to receive that image (11) and which is provided with means for removing any spurious signals from the scattered radiation (4). A shutter means is placed between the screen (10) and the camera (18) which is arranged to open after the spurious signal has been removed to allow the camera to record the light image (11) retained on the screen (10).

4 Claims, 2 Drawing Sheets

CAMERA SYSTEM

BACKGROUND OF THE INVENTION

1. Field of the Invention

The current invention relates to a camera system for making video images of moving or still objects illuminated by pulsed gamma or neutron radiation.

2. Discussion of Prior Art

Solid state charge coupled device "CCD" cameras when used in a high energy gamma or, neutron radiation environment (whether pulsed or not) suffer from radiation induced artefacts. These artefacts are caused by scattered gamma or neutron radiation and are referred to by those skilled in the art as gamma induced background or neutron stars. These artefacts arise when the scattered gamma or neutron radiation passes through the camera structure to directly affect an imaging sensor within the camera. As a result an image produced by the sensor, lacks purity because of these radiation induced artefacts. In some circumstances the image is totally masked by the artefacts. Shielding the camera from the source of radiation in many instances is either impractical or ineffective.

The problem to which the current invention is addressed can be illustrated by referring to a paper in IEEE Transactions on Nuclear Science Vol 39 No Oct. 5, 1992. Experiments discussed in this paper demonstrate the capability to measure bursts of neutron fluences and gamma or X-ray fluxes directly with CCD cameras. In these experiments the neutron fluences or gamma fluxes form not only the incident beam but also give rise inevitably to scattered neutron fluences or scattered gamma beams that directly interfere with the television "TV" camera sensor during the same time window.

A conflict arises in that an image that is formed on a radiation to light converter or fluorescer by the incident beam has both intensity and spatially quantifiable information whereas the image formed on the TV camera sensor by the scattered beams have neither. Consequently, when both the image on the fluorescer and the TV sensor are combined in the TV sensor the result is a composite from both sources.

SUMMARY OF THE INVENTION

The objective of the invention is to remove from the final image produced by the TV camera the spurious signals caused by the scattered radiation interfering with the TV sensor. These spurious signals arise in the case of the ionizing radiation in the form of a photo charge but cause no permanent damage. In the case of the high energy particles they can cause localised current spikes and are stored within the TV sensor also as a photo-charge. For example collisions between neutrons and silicon nuclei produce photo charge artefacts known as neutron stars.

The Applicant has found that the high energy particles produce no permanent damage possibly as a result of restricting the accumulated dose to the TV sensor when a pulsed source of radiation is used.

In a CCD, a light image on the TV sensor is absorbed by a silicon layer to give rise to an electron and hole pair of which the electron is subsequently collected by a polysilicon electrode structure within the CCD device to generate a photo signal. The depth at which the electrons are produced is dependent on the wavelength of the light but 90% of all light at 400 nm is absorbed within the first 25 micrometers of silicon and 90% of all light at 900 nm is absorbed within the first 60 micrometers of silicon. Thus only a thin silicon layer is required to absorb and detect the visible illumination.

Thus it can be seen that the scattered radiation and the light emitted as a result of the interaction of the direct radiation with the fluorescent screen produce similar photo charge within the TV camera sensor.

As both images occur at the same time the problem is how to separate them. Any attempt to refresh the TV sensor would of course remove the spurious or unwanted image as well as the wanted image which is obviously quite unacceptable apart from losing the use of the TV sensor for at least 1 millisecond.

According to the current invention there is provided an apparatus for recording a transient radiation event consisting of direct and scattered radiation having a first fluorescent screen producing a light image of the direct radiation and a television camera arranged to receive the light image having a charged coupled device within which is an anti-blooming gate characterised in that the anti-blooming gate within the charge coupled device is configured such that rapidly applying positive charge to the electrode removes negative photo charge caused by impinging scattered radiation; and in that a shutter means is placed between the fluorescent screen and the television camera with the shutter means is arranged such that opening the shutter after the photo charge has been removed allows the television camera to record the light image formed on the fluorescent screen.

The advantage of this arrangement is that the unwanted artefacts resulting from the spurious radiation signals are removed so that a high quality image is produced by the TV camera of a scene of interest.

The direct radiation is radiation reflected from the scene of interest and arises from a source of pulsed radiation and comprises high energy photons (ionizing radiation for example gamma rays, x-rays, cosmic rays) or high energy particles for example neutrons or protons.

The scattered radiation arises from the same source as the direct radiation but is scattered such that some of the radiation may pass through the TV camera structure to interfere with the TV camera sensor.

The invention applies equally well to CCD cameras configured at normal TV scanning rates as well as fast read out CCD cameras although the invention was initially made for fast read out CCD TV cameras.

In a CCD device fitted with an electrode known as an anti-blooming gate "ABG" a fixed static potential exists on the ABG and an ABG diode connected to the ABG electrode. The ABG is normally used to control of a saturation level of the photo charge by the removal of excess charge above saturation. This is called "anti-blooming".

It has been demonstrated by the Applicant that rapid application of a positive charge to the ABG electrode (known as pulsing) removes all the negative photo charge with high efficiency. For example removal efficiency approaching the normal charge transfer efficiency from the CCD has been achieved. The Applicant has successfully made a fast read out imager incorporating an ABG.

Using an apparatus according to the invention the Applicant has found that high energy gamma and 14 MeV neutron radiation artefacts can be completely removed from the CCD by this fast removal technique. Such a fast removal technique allows when the ABG is negatively pulsed for 1 microsecond to completely remove all the photo charge arising from the radiation induced artefacts. This parasitic charge which typically may last only for tens of nanoseconds for gamma radiation artefacts or 100 nanoseconds for neutron artefacts which may occur over a micro second window.

According to yet another aspect of the invention the shutter means may comprise a first image intensifier and a second image intensifier the first image intensifier placed between the fluorescent screen and the second image intensifier a first photophorescent screen of the first image intensifier having a slow decay phosphor producing a latent image of the light image on the fluorescent screen, the second image intensifier shuttering the first phosphorescent screen during the passage of the scattered radiation.

According to yet another aspect of the invention the second phosphorescent screen of the second image intensifier may have a fast decay phosphor situated adjacent to the charge coupled device of the television camera.

The electrode known as the anti blooming electrode which may be a structure situated within the charge coupled device comprises a transfer electrode of polysilicon, a gate of metal for example aluminium and a drain of doped or impure silicon. The polysilicon transfer electrode after exposure to light or neutron or gamma radiation may collect electrons as a stored charge maintained at a predetermined level by a negative barrier potential on the gate changing the barrier potential on the gate to a positive value releases the stored electrons which flow to the drain maintained at a higher positive value.

BRIEF DESCRIPTION OF THE DRAWINGS

One embodiment of the invention will now be described, by way of example only, with reference to the accompanying drawings, of which.

DETAILED DISCUSSION OF PREFERRED EMBODIMENTS

Figure 1:
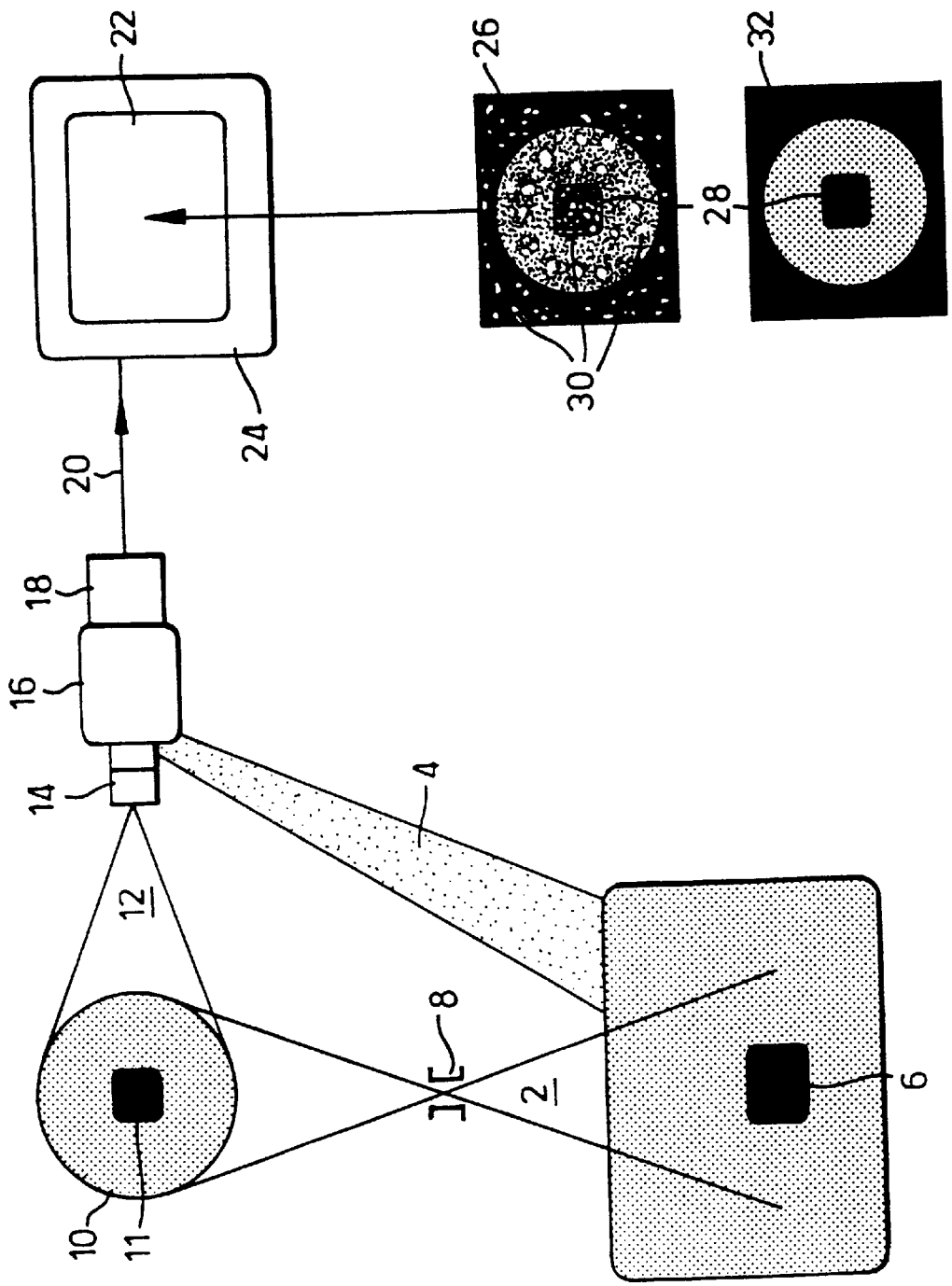
FIG. 1 shows a schematic diagram of an experiment using a camera system according to the invention.

Referring firstly to FIG. 1, which shows a schematic diagram of an experiment using a camera system according to the invention. A beam of direct radiation 2 and a beam of scattered radiation 4 emanate from a source of radiation 6. The beam of direct radiation passes through a pin hole collimator 8 (a 4 mm aperture in 25 mm thick lead wall) to impinge on a fluorescent screen 10 to produce a light image 11. The fluorescent screen 10 has a nanosecond decay time. A beam of light 12 passes into a lens 14, an intensifier/shutter combination 16 and a TV camera 18. A video signal 20 passes to a display 22 on a monitor 24. An example display 26 shows an image 28 of the scene of interest 11 and 6 with neutron or gamma artefacts 30 interfering with the image 28. An example display 32 shows an image of the scene of interest 11 and 6 with out neutron or gamma artefacts interfering with the image 28.

Figure 2:
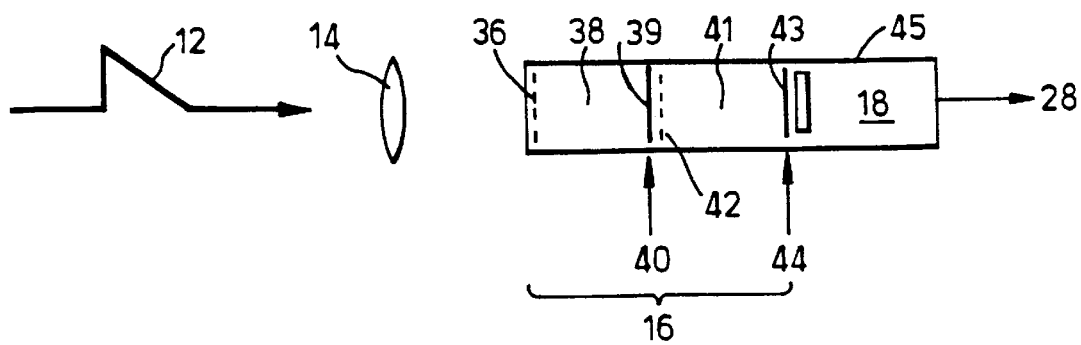
FIG. 2 shows details of an image intensifies combination of a camera system according to the invention.

Referring to FIG. 2, detailing image processing using a camera system according to the invention. The image intensifier combination 16 comprises a first image intensifier 38 consisting of a micro-channel plate intensifier known to those skilled in the art as a Generation 2 or GEN 2 intensifier and a second image intensifier 41 consisting of a cross over tube image intensifier known to those skilled in the art as a Generation 1 intensifier or GEN 1 intensifier. The GEN 2 intensifier 38 is mounted in front of the GEN 1 intensifier 41 as follows. Light 12 from the fluorescent screen 10 shown on FIG. 1 passes through the lens 14 to fall on a first photo cathode 36 to produce a second light image 39 on the first phosphorescent (phosphor) screen 40 comprising a slow (milli second) decay phosphor known to those skilled in the art as a P20 phosphor. The second light image 39 is then recorded by the second photo cathode 42 to produce a third light image 43 on the second phosphorescent (phosphor) screen 44 comprising a fast (100 s of nanoseconds) decay phosphor known to those skilled in the art as a P48 phosphor. The third light image 43 is then recorded by the CCD 45 of the TV camera 18 to produce the video signal 28. The Applicant has found that to implement the invention the first phosphorescent screen 40 should preferably have a slow image decay rate measured in milliseconds; and that the second phosphorescent screen 44 should preferably have a fast image decay rate measured in nanoseconds.

Figure 3A:
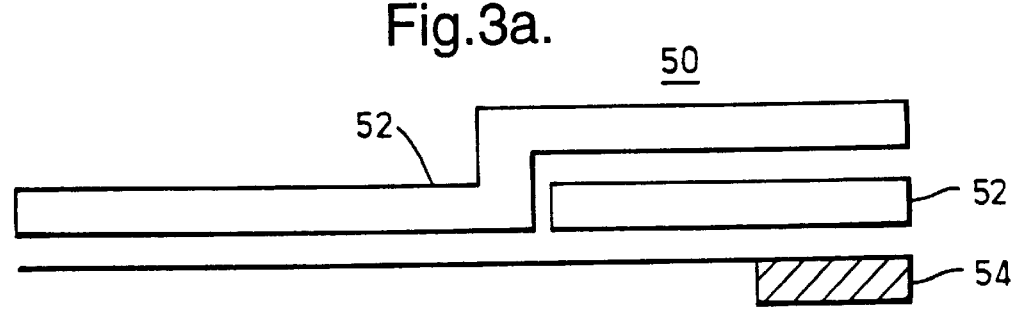
FIGS. 3a–3c shows a diagram of a gated anti-blooming structure.

Referring to FIG. 3a, this details a gated anti blooming structure 50, consisting of a transfer electrode 52 of polysilicon, a gate 52 of metal for example aluminium and a drain 54 of doped that is impure silicon.

Figure 3B:
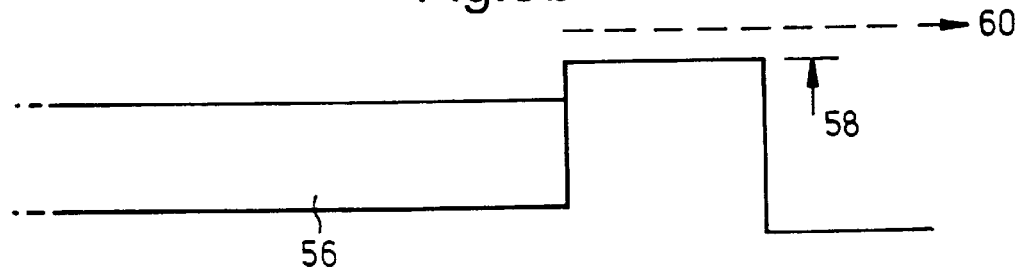

Referring to FIG. 3b, this details the charge stowage on the CCD 45. The polysilicon transfer electrode 52 after exposure to light or neutron or gamma radiation collects electrons as a stored charge 56 as explained previously and may for convenience be referred to a well charge 56.

The well charge 56 is maintained at a predetermined level by a negative barrier potential 58. Excess charge 60 flowing over the barrier 58 which for convenience can be thought of as a sluice gate in a water channel.

Figure 3C:
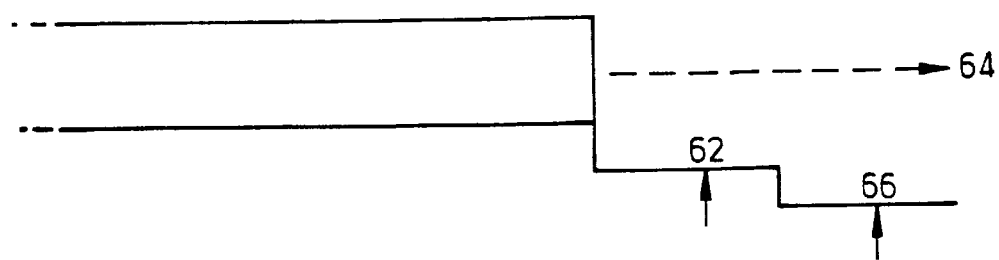

Referring to FIG. 3c, this details the charge dump for exposure control. Pulsing the gate 52 high, that is changing the barrier potential to a positive value 62 releases stored electrons 56 which flow to the drain 54 also maintained at a higher positive value 66.

It will be realised that the fluorescent screen 10 may be substituted by a slow fluorescer to have a slow image decay instead of a fast image decay.

I claim:

1. An apparatus for recording a transient radiation event consisting of direct and scattered radiation, said apparatus comprising:

a first fluorescent screen producing a light image of the direct radiation; and a television camera arranged to receive the light image having a charged coupled device within which is an anti-blooming gate, the anti-blooming gate is configured such that rapidly applying positive charge to the gate removes negative photo charge caused by impinging scattered radiation; and in that a shutter is placed between the fluorescent screen and the television camera with the shutter arranged such that opening the shutter after the photo charge has been removed allows the television camera to record the light image formed on the fluorescent screen.

2. An apparatus as claimed in claim 1, wherein the shutter comprises a first image intensifier and a second image intensifier the first image intensifier placed between the fluorescent screen and the second image intensifier a first phosphorescent screen of the first image intensifier having a slow decay phosphor producing a latent image of the light image on the fluorescent screen, the second image intensifier shuttering the first phosphorescent screen during the passage of the scattered radiation.

3. An apparatus as claimed in claim 2, wherein the phosphorescent screen of the second image intensifier is provided with a fast decay phosphor and is situated adjacent to the charge coupled device of the television camera.

4. An apparatus for recording a transient radiation event consisting of direct and scattered radiation, said apparatus comprising:

a first fluorescent screen producing a light image of the direct radiation;

a television camera responsive to the light image, said camera including a charged coupled device, said device including an anti-blooming gate, wherein a rapidly applied positive charge to the gate removes any negative photo charge caused by impinging scattered radiation; and a shutter is placed between the fluorescent screen and the television camera with the shutter arranged such that opening the shutter after the photo charge has been removed allows the television camera to record the light image formed on the fluorescent screen.

* * * * *